Patented Aug. 8, 1939

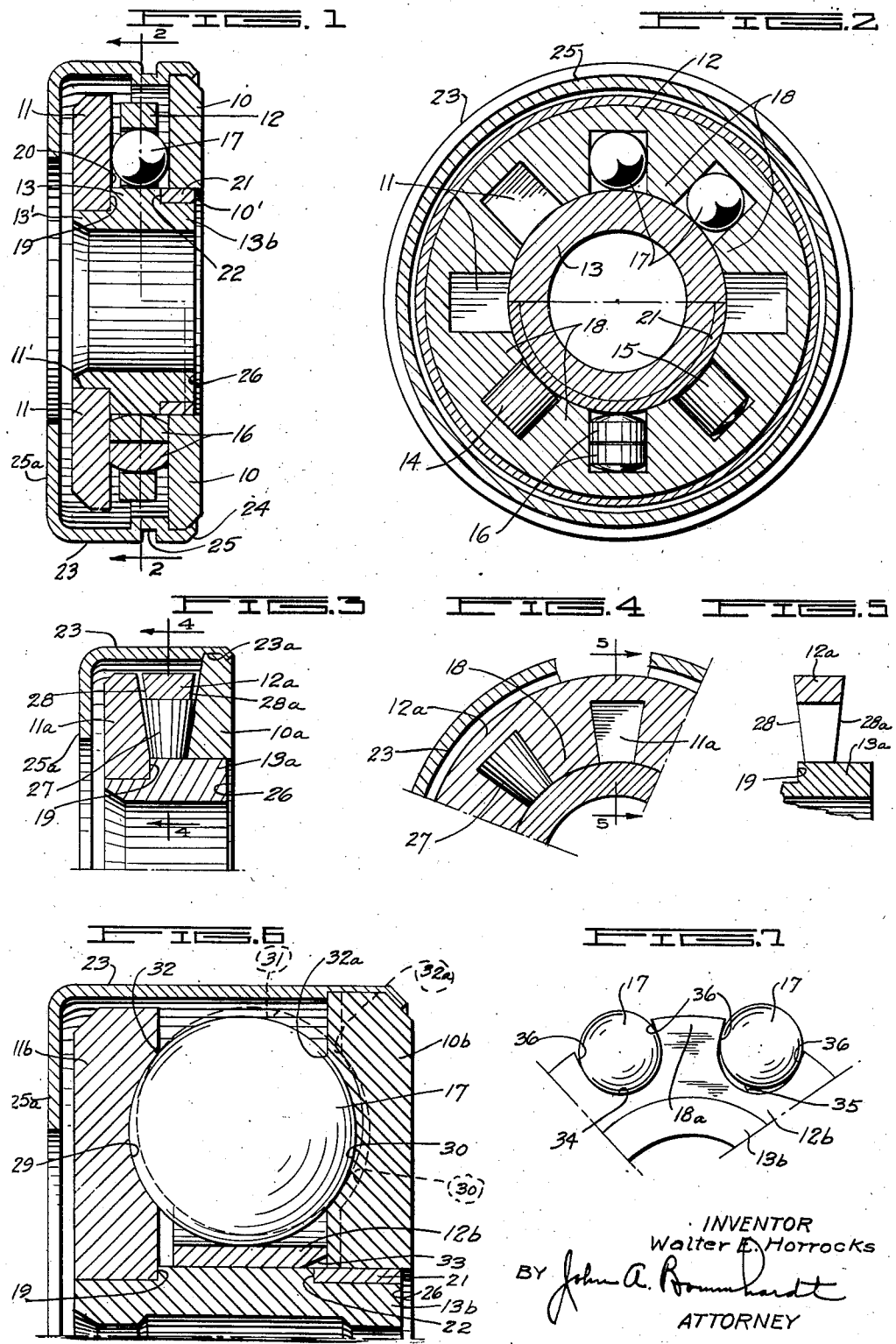

2,168,342

UNITED STATES PATENT OFFICE 2,168,342

SELF-CONTAINED THRUST BEARING

Walter E. Horrocks, Lakewood, Ohio

Application August 3, 1936, Serial No. 94,074

1 Claim. (Cl. 308—232)

REISSUED

My invention relates to self-contained thrust bearings of the anti-friction type, such as ball bearings, cylindrical roller bearings and taper roller bearings and has for its principal object to provide improved means for combining elements, metals, alloys and lubricants into a complete working unit for bearings of this nature. It has been illustrated in connection with bearings of the type that are extensively used as automobile clutch throw-out bearings but it is not limited for use in this location.

Bearings of this nature have proved unsatisfactory due to various causes such as eccentric throw of retainer rings in which the balls are assembled, the eccentric throw being caused when the bearing is running free with the race rings slightly separated to remove the load.

Another cause of bearing failure to withstand constant heavy duty service in which they are used, such as clutch release bearings as are used in trucks, is caused by bearing structures such as those in which the function of the bearing and its coacting parts depend upon the shaft or hub to which the bearing is applied for maintaining the axial alinement of the races and co-acting parts in which the bore of the fixed race ring allows a very small limited contact on the shaft for the supporting of the bearing axially, which results in allowing considerable drag, and frictional contact between the shaft and the component parts of the free moving races, or flanged retainers that are in contact with the shaft when the bearing is not under a load and the races are separated.

One of the objects of my invention relates to an improvement in self-contained thrust bearings having for its object improved means for the maintaining of axial alinement of the opposing races combined with an enclosed bearing separator for maintaining concentric alinement of the balls, or rollers, positioned between the opposing race members.

Another object is to provide a self-contained thrust bearing which can be installed over a shaft without the separator or retainer, or component parts being subjected to damage during installation, or becoming inoperative due to imperforate fitting of the tight race ring upon the shaft, or irregularities in the shafting.

Another object is to provide a self-contained thrust bearing in which the races and component parts that revolve around the shaft to which the bearing is applied, are not in contact with the shaft, thereby eliminating any wear or friction between the shaft and the thrust bearing parts.

Another object is to reduce the number of running fits in retainers of the flanged type, in which the retainers are journaled to the shaft and to the races.

A still further object is to provide a self-contained thrust bearing in which the component parts that are subjected to frictional wear are interchangeable with different combinations of metal, or materials to reduce any frictional wear.

My invention is especially designed for, but not necessarily confined to, thrust bearings in which the thrust bearing faces of the opposing races are permitted to separate slightly when the bearing is running free and is not under load, as is extensively used in connection with automobile clutches.

This invention is also designed to allow of making a self-contained thrust bearing using race members having straight or flat opposing surfaces for the positioning of ball bearings having a point contact with the race members, cylinder roller bearings having a line bearing contact with the race members, ball and cylinder roller bearings being interchangeable between the same opposing race rings, grooved race members for positioning of ball bearings between the grooves of the opposing races, and race members having conical opposing surfaces for the positioning of taper roller bearings having a line bearing contact with the race members.

In order to accomplish these specified results I may use a separator as granted to me in Patent No. 1,941,209 issued December 26, 1933, which allows for a separator comprising a ring with spokes, or projections extending between the rollers, with the sides of the spokes, or projections adjacent to the rollers, being flat to allow for free axial movement between the opposing race members. This separator preferably, but not necessarily, to be made from powdered metal alloys.

The axial alinement of the race rings is maintained by the use of a collar which is fixed to the tight race ring and the concentric alinement of the rolling elements is maintained by using a separator comprising a ring with projections extending inward, with the ends of the projections journaled on the collar of one race ring, or a separator being journaled on the collar of one race ring with projections extending outwardly.

By using the described separators and the free moving race ring journaled on the collar of one race ring as shown in the drawing and as specified, it will be apparent that the combinations which are described will allow for the manufacture of a self-contained thrust bearing, which is suitable for either ball or roller bearings, and will insure axial alinement of the races and concentric alinement of the rolling elements that are positioned between the opposing race members.

With the above and other objects in view, an embodiment of the invention is shown in the accompanying drawing in which:

Fig. 1 is a view in section taken through the center line of the bearing.

Fig. 2 is a view, partially in side elevation and partially in section approximately on the line 2—2 of Fig. 1, showing a self-contained bearing of the thrust type constructed as described in the invention adapted for the use of either ball or cylindrical rolling elements.

Fig. 3 is a partial view in section showing the invention as applied to taper roller bearings.

Fig. 4 is a fragmentary view in section as is shown on the line 4—4 of Fig. 3 showing the separator projections journaled to the race collar, with one taper roller in position and one open roller pocket.

Fig. 5 is a view in section on line 5—5 of Fig. 4 which shows a cross section of the separator journaled to the race collar as used with taper roller bearings.

Fig. 6 is a partial enlarged section view showing the invention as applied to ball bearings which track in grooved races.

Fig. 7 is a fragmentary view of the ball bearing separator showing the position of the balls in the separator when the bearing is operating under a load, and as when the bearing is running free and is not operating under a load.

Referring to the drawing, at Figs. 1 and 2 is shown a thrust bearing containing ball and roller bearings, comprising axially spaced race members 10 and 11 and a separating ring 12 which is journaled on a collar 13 of the fixed race ring 11. Rolling load members 14, 15, 16 or 17 are positioned between the projecting portions 18 of the separating ring 12 which maintains the rolling elements 14, 15, 16 or 17 in concentric alinement.

The collar 13 on which the separator 12 is journaled is fixed to the race ring 11 by pressing the reduced end 13' of the collar 13 into the bore 11' of the race ring 11 with the shoulder 19 of the collar 13 seated to the inner face 20 of the race ring 11.

The collar 13 on which the separator 12 is journaled, may have an extra journal bearing band 21 which is to be made from elements other than those contained in the collar 13. The object of this feature is to obtain additional advantages by arranging different combinations of the elements or alloys that come in frictional contact with each other. The journal bearing band 21 is press fitted onto the shouldered end 13b of the collar 13 and seated against the shoulder 22 of the collar 13 as shown.

The free acting race ring 10 is journaled on to the collar 13, or the journal bearing band 21, as the case may be, which maintains the axial alinement of the race rings 10 and 11 either when they are allowed to separate, as when the bearing is not under a load, or as when the bearing is operating under a load with the races 10 and 11 and the rolling elements 14, 15, 16 or 17 being in contact with each other.

The entire bearing is held together with a casing or jacket 23 which is secured to the free moving race 10 by spinning the edge 24 of the jacket or casing over the outer end of the race 10, the race 10 being shouldered on to a bead 25 which is rolled into the casing or jacket. The casing or jacket 23 has a flange 25a extending axially to embrace the race 11 with a small amount of clearance allowed between the inner side of the flange 25a and the race 11.

The interior void space of the bearing is filled with a suitable grade of lubricant adapted for the lubrication of the rolling elements 14, 15, 16 or 17 and the contacting component parts of the bearing.

When the bearing is to be installed over a shaft or hub, pressure is applied to the end 26 of the collar 13 which eliminates any possibility of damaging any of the component working parts of the bearing.

The collar 13 being substantially secured within the bore 11' of the fixed race 11 and extending into the bore 10' of the free moving race 10 isolates, or separates, all co-acting movable parts of the bearing from any contact with the shaft or hub, to which the bearing may be applied. This feature results in reducing the number of frictional radial contacts and running fits of the component parts of the bearing to a minimum.

Installation of the bearing with the collar 13 pressed over a shaft or hub that is slightly out of round, or of irregular dimensions, will not negative the bearing from maintaining axial alinement of the races, and concentric alinement of the load bearing rolling elements.

Figs. 3, 4, and 5 illustrate the invention applied to taper roller bearings 27 in which the separating ring 12a has the side faces 28 and 28a tapered to conform with the faces of the opposing races 10a and 11a. The casing 23 is shown secured to the race ring 10a by shell reaming the end of the casing to form a shoulder 23a for the seating of the race 10a with the edge of the casing spun over the chamfered corner of the race as shown.

Fig. 6 illustrates the invention applied to ball bearings 17 which track in grooves 29 and 30 of opposing races 10b and 11b in which the dotted concave line 30 shows the location of the inner face of the free moving race 10b as when the bearing is running free without any load which allows the races 10b and 11b to separate slightly. The circular dotted line 31 indicates the position of the balls 17 in relation to the grooves 29 and 30 as when the bearing is not under a load, but is revolving at high speed resulting in the centrifugal action maintaining concentric alinement of the ball bearings 17 by contact with the outer periphery 32 and 32a of the grooves 29 and 30 respectively.

When the bearing is under a load and the thrust race 10b is thrust toward the opposing race 11b the balls 17 will assume the position in the grooves 29 and 30 as indicated, being maintained in concentric alinement by the outer periphery 32 and 32a of the grooves 29 and 30, the separating ring 12b which is journaled on the collar 13b with the corner 33 of the separator 12b adjacent to the journal bearing band 21 chamfered to avoid any frictional contact with the said journal bearing band 21.

Fig. 7 illustrates the separator 12b journaled to the collar 13b with a ball bearing 17 positioned between the outwardly projecting portions 18a in contact with the separator 12b at the point 34 as when the bearing is in operation under a load. When the bearing is running free and is not under a load the balls 17 assume the position between the projections 18a as shown at 35. The variable concentric alinement of the ball bearings 17 as caused when the bearing is running free and not under a load, and as when the bearing is running under a load, is accomplished by the straight sides 36 of the separator projections 18a which allows the balls 17 to shift from one concentric alinement into another concentric alinement maintaining the equal spacing of the balls 17 within the bearing.

If the fixed races 11, 11a, 11b and the collars 13, 13a, and 13b are to be made of the same elements, the two pieces can be combined in one piece in a forging, stamping, or casting, thereby eliminating the joining between the race and the collar at the shoulder 19.

From the foregoing description the operation of the invention will be apparent as the collar which is attached to one race ring allows of free axial reciprocative movement of the opposing race ring, and the separators that are journaled thereto. The casing that is attached to the free moving race ring, for holding the selected lubricants within the bearing, makes a bearing that is a self-contained unit with all of the component parts of the bearing functioning within itself for the maintaining of axial and concentric alinement of the co-acting functioning elements.

This will allow in manufacturing of bearings of this type, to have all of the movable parts assembled into a complete unit under the supervision of the bearing manufacturer, thereby eliminating the dependency of multiple running fits to outside sources for the functioning of the bearing.

It will be understood that slight modifications can be made of this invention without departing from the spirit of the scope of the invention.

Having described my invention, what I claim and desire to secure by Letters Patent is:

A self-contained thrust bearing comprising a pair of flat opposing races, one race ring having a collar attached thereto, an opposing race ring journaled on the said collar to allow of free axial movement of the opposing race ring on said collar, a separator having projections, journaled on said collar, with balls or rollers interchangeable between the opposing race rings and the projections of the separating ring.

WALTER E. HORROCKS.